US012320983B1

(12) United States Patent
Danziger

(10) Patent No.: US 12,320,983 B1
(45) Date of Patent: Jun. 3, 2025

(54) IMAGE PROJECTOR WITH POLARIZING CATADIOPTRIC COLLIMATOR

(71) Applicant: Lumus Ltd., Ness Ziona (IL)

(72) Inventor: Yochay Danziger, Kfar Vradim (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/878,954

(22) PCT Filed: Aug. 17, 2023

(86) PCT No.: PCT/IL2023/050873
§ 371 (c)(1),
(2) Date: Dec. 26, 2024

(87) PCT Pub. No.: WO2024/038458
PCT Pub. Date: Feb. 22, 2024

Related U.S. Application Data

(60) Provisional application No. 63/405,945, filed on Sep. 13, 2022, provisional application No. 63/398,921, filed on Aug. 18, 2022.

(51) Int. Cl.
*G02B 27/30* (2006.01)
*G02B 26/10* (2006.01)
(Continued)

(52) U.S. Cl.
CPC ....... *G02B 27/0172* (2013.01); *G02B 27/123* (2013.01); *G02B 27/126* (2013.01); *G02B 27/283* (2013.01); *G02B 27/30* (2013.01)

(58) Field of Classification Search
CPC ............. G02B 27/0172; G02B 27/123; G02B 27/126; G02B 27/283; G02B 27/30
(Continued)

(56) References Cited

U.S. PATENT DOCUMENTS 2,748,659 A   6/1956  Geffcken et al.
2,795,069 A   6/1957  Hardesty
              (Continued)

FOREIGN PATENT DOCUMENTS

JP   2011-028141   2/2011

OTHER PUBLICATIONS

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).
(Continued)

*Primary Examiner* — Wyatt A Stoffa
*Assistant Examiner* — Grant A Gagnon
(74) *Attorney, Agent, or Firm* — Rivka Friedman

(57) ABSTRACT

An image projector for injecting a collimated image into an entrance aperture of a lightguide employs collimating optics including a polarizing catadioptric arrangement to provide enhanced proximity of the principal plane of the collimating optics to the entrance aperture of the lightguide, thereby reducing the size of the optics or allowing an enlarged field of view for optics of a given size. Disclosed embodiments employ a front-lit polarization-modifying spatial light modulator (SLM) illuminated via a polarizing beam splitter (PBS) prism with a 30-degree or 45-degree PBS angle, laser scanning illumination arrangements, with or without an SLM, and active-matrix image generators combined via a dichroic combiner cube.

17 Claims, 10 Drawing Sheets

(51) Int. Cl.
  *G02B 27/01* (2006.01)
  *G02B 27/12* (2006.01)
  *G02B 27/28* (2006.01)
  *G02F 1/1362* (2006.01)
  *G03B 21/00* (2006.01)
  *H04N 9/31* (2006.01)

(58) Field of Classification Search
  USPC .................................................. 359/630
  See application file for complete search history.

(56) References Cited

U.S. PATENT DOCUMENTS

| | | | |
|---|---|---|---|
| 2,886,911 A | 5/1959 | Hardesty |
| 3,491,245 A | 1/1970 | Hardesty |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,940,204 A | 2/1976 | Withrington |
| 3,969,023 A | 7/1976 | Brandt et al. |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,516,828 A | 5/1985 | Steele |
| 4,613,216 A | 9/1986 | Herbec et al. |
| 4,662,717 A | 5/1987 | Yamada et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | David |
| 5,745,199 A | 4/1998 | Suzuki et al. |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,222,677 B1 | 4/2001 | Budd et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,483,113 B1 | 11/2002 | Sealy et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,671,100 B1 | 12/2003 | McRuer |
| 6,690,513 B2 | 2/2004 | Hulse et al. |
| 6,710,902 B2 | 3/2004 | Takeyama |
| 6,799,859 B1 | 5/2004 | Ida et al. |
| 6,762,801 B2 | 7/2004 | Weiss et al. |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,880,931 B2 | 4/2005 | Moliton et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 4/2008 | Amitai et al. |
| 7,355,795 B1 | 4/2008 | Yamazaki et al. |
| 7,384,159 B2 | 6/2008 | Takeda |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,612,879 B2 | 11/2009 | Stumpe et al. |
| 7,643,214 B2 | 1/2010 | Amitai |
| 7,672,055 B2 | 3/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,808,625 B2 | 10/2010 | Nakamura et al. |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,405,573 B2 | 3/2013 | Lapidot et al. |
| 8,432,614 B2 | 4/2013 | Amitai |
| 8,433,172 B2 | 4/2013 | Pascal et al. |
| 8,643,948 B2 | 2/2014 | Amitai et al. |
| 8,666,208 B1 | 3/2014 | Amirparviz et al. |
| 8,718,437 B2 | 5/2014 | Coe-Sullivan |
| 8,870,384 B2 | 10/2014 | Imai et al. |
| 8,913,865 B1 | 12/2014 | Bennett |
| 9,025,253 B2 | 5/2015 | Hadad et al. |
| 9,523,852 B1 | 12/2016 | Brown et al. |
| 9,541,762 B2 | 1/2017 | Mukawa et al. |
| 9,551,880 B2 | 1/2017 | Amitai |
| 9,709,809 B2 | 7/2017 | Miyawaki et al. |
| 10,222,535 B2 | 3/2019 | Remhof et al. |
| 10,302,957 B2 | 5/2019 | Sissom |
| 10,437,068 B2 | 10/2019 | Weng |
| 10,466,479 B2 | 11/2019 | Shih et al. |
| 10,571,636 B2 | 2/2020 | Gelberg |
| 10,739,598 B2 | 8/2020 | Ofir |
| 10,809,528 B2 | 8/2020 | Amitai |
| 10,795,156 B2 | 10/2020 | Marshall |
| 10,830,938 B2 | 11/2020 | Ronen et al. |
| 10,908,426 B2 | 2/2021 | Amitai |
| 10,951,867 B2 | 3/2021 | Pappas et al. |
| 10,969,590 B1 | 4/2021 | Danziger et al. |
| 11,262,564 B2 | 3/2022 | Tanaka |
| 11,523,092 B2 | 12/2022 | Greenstein et al. |
| 2001/0000124 A1 | 4/2001 | Kollin et al. |
| 2001/0030860 A1 | 10/2001 | Kimura et al. |
| 2002/0015233 A1 | 2/2002 | Park |
| 2002/0097762 A1 | 7/2002 | Yoshimura et al. |
| 2002/0176173 A1 | 11/2002 | Song |

(56) References Cited

U.S. PATENT DOCUMENTS

| | | |
|---|---|---|
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai |
| 2003/0169504 A1 | 9/2003 | Kaminsky et al. |
| 2003/0197938 A1 | 10/2003 | Schmidt et al. |
| 2003/0218718 A1 | 11/2003 | Moliton et al. |
| 2003/0235768 A1 | 12/2003 | Fincher et al. |
| 2004/0013068 A1 | 1/2004 | Aastuen et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0012842 A1 | 1/2005 | Miyagawa et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0171046 A1 | 8/2006 | Recco et al. |
| 2006/0268421 A1 | 11/2006 | Shimizu et al. |
| 2007/0035707 A1 | 2/2007 | Margulis |
| 2007/0070859 A1 | 3/2007 | Hirayama |
| 2007/0159673 A1 | 7/2007 | Freeman et al. |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0259429 A1 | 10/2008 | Kamm et al. |
| 2008/0278812 A1 | 11/2008 | Amitai |
| 2009/0010023 A1 | 1/2009 | Kanade et al. |
| 2009/0122414 A1 | 5/2009 | Amitai |
| 2009/0190222 A1 | 7/2009 | Simmonds et al. |
| 2010/0053148 A1 | 3/2010 | Khazeni et al. |
| 2010/0067110 A1 | 3/2010 | Yaakov et al. |
| 2010/0111472 A1 | 5/2010 | DeJong |
| 2010/0201128 A1 | 8/2010 | Saccomammo |
| 2010/0202048 A1 | 8/2010 | Amitai et al. |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0194781 A1 | 8/2012 | Agurok |
| 2012/0206817 A1 | 8/2012 | Totani et al. |
| 2012/0274751 A1 | 11/2012 | Smith et al. |
| 2012/0306940 A1 | 12/2012 | Machida |
| 2013/0007833 A1 | 1/2013 | Kitazato et al. |
| 2013/0016292 A1 | 1/2013 | Mlao et al. |
| 2013/0022316 A1 | 1/2013 | Pelletier et al. |
| 2013/0027655 A1 | 1/2013 | Blum et al. |
| 2013/0135749 A1 | 5/2013 | Akutsu et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0160577 A1 | 6/2014 | Dominici et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2014/0334777 A1 | 11/2014 | Dubroca et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0219834 A1 | 8/2015 | Nichol et al. |
| 2015/0241619 A1 | 8/2015 | Richards et al. |
| 2015/0331546 A1 | 11/2015 | Craven-Bartle et al. |
| 2016/0062119 A1 | 3/2016 | Fitch et al. |
| 2016/0202048 A1 | 7/2016 | Meng |
| 2016/0234485 A1 | 8/2016 | Robbins et al. |
| 2016/0238844 A1 | 8/2016 | Dobschal |
| 2016/0370693 A1 | 12/2016 | Watanabe |
| 2017/0004574 A1 | 1/2017 | Deats et al. |
| 2017/0045743 A1 | 2/2017 | Dobschal et al. |
| 2017/0045744 A1 | 2/2017 | Amitai |
| 2017/0075119 A1 | 3/2017 | Schultz et al. |
| 2017/0097506 A1 | 4/2017 | Schowengerdt et al. |
| 2017/0242249 A1 | 8/2017 | Wall |
| 2017/0285346 A1 | 10/2017 | Pan |
| 2017/0293140 A1 | 10/2017 | Cai et al. |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0357100 A1 | 12/2017 | Ouderkirk et al. |
| 2017/0363799 A1 | 12/2017 | Ofir |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267295 A1 | 9/2018 | Dalrymple et al. |
| 2018/0292599 A1 | 10/2018 | Ofir et al. |
| 2018/0335629 A1 | 11/2018 | Cheng et al. |
| 2019/0170327 A1 | 6/2019 | Eisenfeld et al. |
| 2019/0187482 A1 | 6/2019 | Lanman |
| 2019/0212487 A1 | 7/2019 | Danziger et al. |
| 2019/0227215 A1 | 7/2019 | Danziger et al. |
| 2019/0293856 A1 | 9/2019 | Danziger |
| 2019/0377187 A1 | 12/2019 | Sharlin et al. |
| 2019/0378044 A1 | 12/2019 | Jeffery et al. |
| 2019/0391408 A1 | 12/2019 | Mansharof |
| 2020/0026072 A1 | 1/2020 | Brown et al. |
| 2020/0089001 A1 | 3/2020 | Amitai et al. |
| 2020/0183170 A1 | 6/2020 | Amitai et al. |
| 2020/0192101 A1 | 6/2020 | Ayres et al. |
| 2020/0225484 A1 | 7/2020 | Takagi et al. |
| 2020/0278557 A1 | 9/2020 | Greenstein et al. |
| 2020/0292819 A1 | 9/2020 | Danziger et al. |
| 2020/0360879 A1 | 11/2020 | Arnold et al. |
| 2020/0371311 A1 | 11/2020 | Lobachinsky et al. |
| 2020/0371354 A1 | 11/2020 | Ouderkirk et al. |
| 2021/0018755 A1 | 1/2021 | Amitai |
| 2021/0033872 A1 | 2/2021 | Rubin et al. |
| 2021/0072553 A1 | 3/2021 | Danziger et al. |
| 2021/0149199 A1 | 5/2021 | Guan et al. |
| 2022/0004014 A1 | 1/2022 | Ronen et al. |
| 2022/0030205 A1 | 1/2022 | Danziger |
| 2022/0113549 A1 | 4/2022 | Danziger et al. |
| 2022/0269098 A1 | 8/2022 | Danziger et al. |
| 2022/0342216 A1 | 10/2022 | Danziger et al. |
| 2023/0296899 A1 | 9/2023 | Ronen et al. |

OTHER PUBLICATIONS

R. J. Weiblen, C. R. Menyuk, L. E. Busse, L. B. Shaw, J. S. Sanghera, and I. D. Aggarwal, "Optimized moth-eye anti-reflective structures for As2S3 chalcogenide optical fibers," Opt. Express 24, 10172-10187 (2016).

Qiao, DY., Wang, SJ. & Yuan, Wz. A continuous-membrane micro deformable mirror based on anodic bonding of SOI to glass wafer. Microsyst Technol 16, 1765-1769 (2010). https://doi.org/10.1007/s00542-010-1102-0.

J. Wei, S.M.L. Nai, C.K. Wong, L.C. Lee, "Glass-to-glass anodic bonding process and electrostatic force" Thin Solid Films, vols.

(56) References Cited

OTHER PUBLICATIONS 462-463, 2004, pp. 487-491, ISSN 0040-6090, https://doi.org/10.1016/j.tsf.2004.05.067. (https://www.sciencedirect.com/science/article/pii/S0040609004006613).

Halifoux B.D. et al., "Compensating film stress in thin silicon substrates using ion implantation," Opt. Express 27, 11182-11195 (Jan. 21, 2019) Chalifoux B.D et al. Jan. 21, 2019 (Jan. 21, 2019).

Jinying Li et al "Improvement of pointing accuracy for Risley prisms by parameter identification", Sep. 2017Applied Optics 56(26):7358; DOI:10.1364/AO.56.007358.

Klaus Ehrmann et al "Optical power mapping using paraxial laser scanning", Proceedings vol. 7163, Ophthalmic Technologies XIX; 71631E (2009) https://doi.org/10.1117/12.806765 Event: SPIE BiOS, 2009, San Jose, California, United States.

Erhui Qi et al "The Application of Pentaprism Scanning Technology on the Manufacturing of M3MP",Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.

Wei Chen et al"An Image Quality Evaluation Method of near-eye display" , First published: May 25, 2016 https://doi.org/10.1002/sdtp.10935.

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

Amotchkina T. et al; "Stress compensation with antireflection coatings for ultrafast laser applications: from theory to practice," Opt. Express 22, 30387-30393 (2014) Amotchkina T. et al. Dec. 31, 2014 (Dec. 31, 2014).

Mori H. et al., "Reflective coatings for the future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

Chalifoux B.D. et al., "Compensating film stress in thin silicon substrates using ion implantation," Opt. Express 27, 11182-11195 (Jan. 21, 2019) Chalifoux B.D. et al. Jan. 21, 2019 (Jan. 21, 2019).

Petros I. Stavroulakis, Stuart A. Boden, Thomas Johnson, and Darren M. Bagnall, "Suppression of backscattered diffraction from sub-wavelength 'moth-eye' arrays," Opt. Express 21, 1-11 (2013).

Qiaoyin Yang et al. "Antireflection effects at nanostructured material interfaces and the suppression of thin-film interference" 2013 Nanotechnology, vol. 24, No. 23 May 15, 2013.

S. Chattopadhyay et al. "Anti-reflecting and photonic nanostructures," Materials Science and Engineering: R: Reports, vol. 69, Issues 1-3, 2010, pp. 1-35, ISSN 0927-796X, https://doi.org/10.1016/j.mser.2010.04.001.

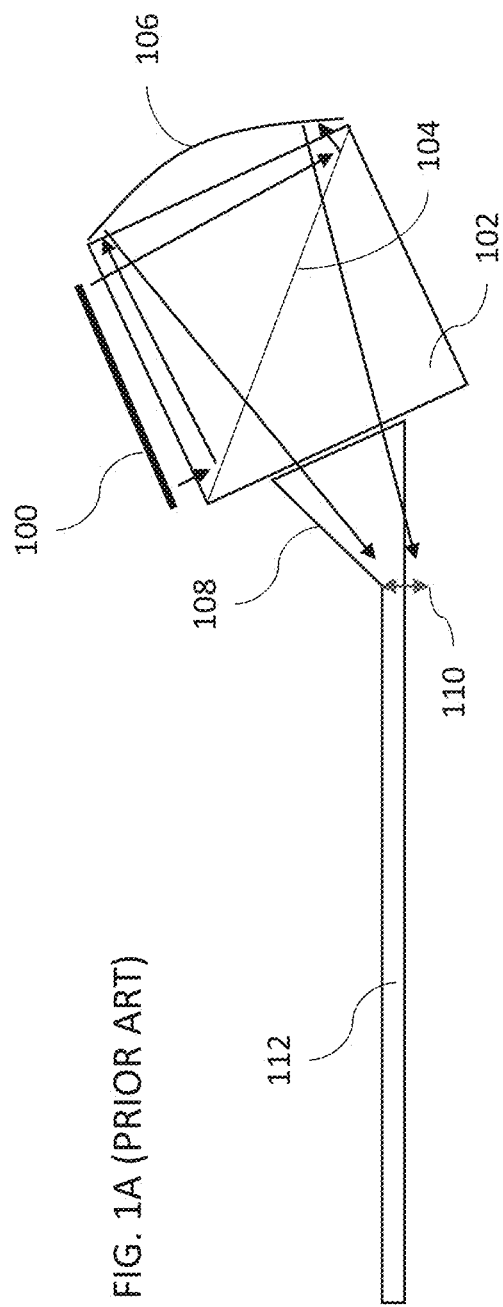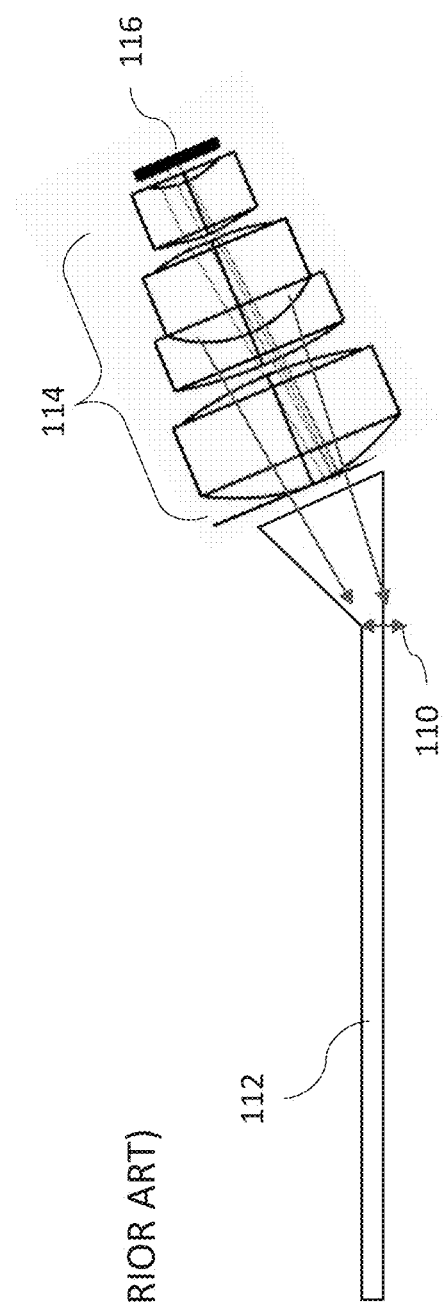
FIG. 1A (PRIOR ART)
FIG. 1B (PRIOR ART)

IMAGE PROJECTOR WITH POLARIZING CATADIOPTRIC COLLIMATOR

FIELD AND BACKGROUND OF THE INVENTION

The present invention relates to near-eye displays and, in particular, it concerns an image projector with a polarizing catadioptric collimator for injecting images into a lightguide of an augmented reality display.

Near-eye augmented reality displays typically employ an image projector to inject a collimated image into a lightguide which conveys the image to the user's eyes while allowing simultaneously a view of the real world through the lightguide. In order to provide a uniform image, it is preferable that the injected image should fill the thickness of the lightguide. This requirement, together with the angular field of view (FOV) of the image dictates the minimum size of the collimating optics which is required for collimating the image prior to injection into the lightguide. Two such examples are illustrated schematically in FIGS. 1A and 1B.

Specifically, in FIG. 1A, there is shown schematically an augmented reality display in which an image is generated by an LCOS display chip 100 associated with a face of a prism 102. The illumination arrangement is omitted for simplicity of presentation. The image is reflected by a polarizing beam splitter (PBS) 104 towards reflective collimating optics 106, which collimates the image for delivery via a coupling prism 108 to the entrance aperture 110 of a lightguide 112. The entrance aperture is shown as being twice the thickness of the lightguide, since this is the geometrical requirement to "fill" the entrance aperture with both the downwards-propagating and reflected upwards-propagating image. Internal aperture expansion and/or coupling-out features of the lightguide are also omitted for simplicity of presentation.

It can be seen that the required minimum size of the prism is determined by tracing the outer limits of the required field of view (FOV) backwards from the entrance aperture and ensuring that the entirety of that FOV is provided by collimating optics 106. Since the distance from entrance aperture to the collimating optics is the sum of the dimensions of the coupling prism 108 and the PBS prism 102, the minimum size of the optics for a given field of view is relatively large.

FIG. 1B illustrates schematically an augmented reality display employing a refractive collimating optical arrangement 114 to collimate an image from a display chip 116 for injection through coupling prism 108 to entrance aperture 110 of lightguide 112. Here, the size of the collimating optical arrangement is dictated by extrapolating the FOV back from the entrance aperture 110 to the front principal plane of the optical arrangement. In the example illustrated here, the FOV is significantly narrower than illustrated in FIG. 1A, and still the dimensions of the lenses and the length of the optical arrangement are large compared with the size of the coupling prism 108.

SUMMARY OF THE INVENTION

The present invention is an image projector for injecting a collimated image into an entrance aperture of a lightguide.

According to the teachings of an embodiment of the present invention there is provided, an image projector for injecting a collimated image into an entrance aperture of a lightguide, the image projector comprising: (a) a polarization-modifying spatial light modulator (SLM) deployed for modifying a polarization of illumination according to image data supplied to the SLM; (b) an illumination arrangement for illuminating the SLM with polarized illumination; (c) a polarization-selective element deployed to select light from the SLM corresponding to an image; and (d) collimating optics for collimating the light corresponding to the image so as to provide the collimated image at the entrance aperture of the lightguide, wherein the collimating optics includes a polarizing catadioptric arrangement comprising, sequentially: (i) a first quarter-wave plate; (ii) a first optical surface implemented as a partial reflector; (iii) a second quarter-wave plate; and (iv) a second optical surface implemented as a polarization-selective reflector, wherein at least one of the first and second optical surfaces is implemented as a non-planar surface with optical power which acts twice on the light, once as a refractive lens surface and once as a reflective lens.

According to a further feature of an embodiment of the present invention, the polarization-selective element is a polarizing beam splitter (PBS) integrated into a prism, and wherein the illumination arrangement directs illumination so as to reflect from the PBS towards the SLM.

According to a further feature of an embodiment of the present invention, the PBS is inclined at an angle of 30 degrees to a surface of the SLM, the image projector further comprising an angularly-selective reflector deployed parallel to the SLM between the SLM and the PBS, the illumination arrangement directing illumination so as to reflect from the angularly-selective reflector towards the PBS, and to reflect from the PBS towards the SLM, the angularly-selective reflector being reflective for visible light incident at an angle of incidence of 60 degrees and substantially transparent to visible light incident at an angle of incidence less than 30 degrees.

According to a further feature of an embodiment of the present invention, the PBS is inclined at an angle of 45 degrees to a surface of the SLM, the image projector further comprising a quarter-wave plate and an illumination-optics reflective lens associated with a face of the prism for directing illumination that has passed through the PBS back towards the PBS to be reflected at the PBS towards the SLM.

According to a further feature of an embodiment of the present invention, the illumination arrangement further comprises a light source associated with an illumination aperture from which light propagates through the prism towards the illumination-optics reflective lens, and wherein the illumination-optics reflective lens and the collimating optics are configured to image the illumination aperture to the entrance aperture of the lightguide.

According to a further feature of an embodiment of the present invention, the illumination arrangement further comprises a scanning mirror for scanning a beam of illumination through a range of angles about at least one tilt axis, the scanning mirror being deployed to direct the beam of illumination through the prism towards the illumination-optics reflective lens, and wherein the illumination-optics reflective lens and the collimating optics are configured to image the scanning mirror to the entrance aperture of the lightguide.

According to a further feature of an embodiment of the present invention, the second optical surface is a planar surface that is bonded to an image input surface of the lightguide.

According to a further feature of an embodiment of the present invention, the first optical surface is a planar surface that is bonded to an output surface of the prism.

According to a further feature of an embodiment of the present invention, the first optical surface is a non-planar surface that is bonded to a corresponding non-planar output surface of the prism.

According to a further feature of an embodiment of the present invention, the illumination arrangement comprises a lightguide having a pair of mutually-parallel major surfaces for supporting propagation of illumination by internal reflection at the major surfaces, and a plurality of mutually-parallel partially-reflecting coupling-out surfaces internal to the lightguide and oriented obliquely to the major surfaces so as to couple out illumination towards the SLM.

There is also provided according to the teachings of an embodiment of the present invention, an image projector for injecting a collimated image into an entrance aperture of a lightguide, the image projector comprising: (a) a beam splitter integrated into a prism; (b) an image generator configured for generating an image at an image plane associated with a third face of the prism; and (c) collimating optics for collimating light of the image so as to provide a collimated image at the entrance aperture of the lightguide, wherein the collimating optics includes a polarizing catadioptric arrangement comprising, sequentially: (a) a first quarter-wave plate; (b) a first optical surface implemented as a partial reflector; (c) a second quarter-wave plate; and (d) a second optical surface implemented as a polarization-selective reflector, wherein at least one of the first and second optical surfaces is implemented as a non-planar surface with optical power which acts twice on the light, once as a refractive lens surface and once as a reflective lens.

According to a further feature of an embodiment of the present invention, the beam splitter is a polarizing beam splitter (PBS), the image projector further comprising: (a) an illumination arrangement comprising at least one light source for generating a modulated intensity beam of light and a scanning mirror for scanning the beam of light through a range of angles about at least one tilt axis, the scanning mirror being deployed to direct the beam of light into a first face of the prism; (b) an illumination-optics reflective lens and a first quarter-wave plate associated with a second face of the prism for directing light that has passed through the prism back towards the PBS; (c) a beam-spreading reflector and a second quarter-wave plate associated with the third face of the prism; and (d) a controller for synchronously modulating an intensity of the light source and controlling the scanning mirror so as to generate a time-averaged intensity distribution of light at the beam-spreading reflector corresponding to an image.

According to a further feature of an embodiment of the present invention, the beam splitter is a dichroic mirror, and wherein the image generator is a first active-matrix image generator generating an image emitted as light of at least a first wavelength that is reflected by the dichroic mirror, the image projector further comprising a second active-matrix image generator associated with a second face of the prism, the second active-matrix image generator generating an image emitted as light of at least a second wavelength that is transmitted by the dichroic mirror so as to be combined with the light of the first wavelength on reaching the collimating optics.

According to a further feature of an embodiment of the present invention, there is also provided a second dichroic mirror deployed within the prism non-parallel to the dichroic mirror, the second dichroic mirror being transparent to light of the first and second wavelengths and reflective to light of a third wavelength, the image projector further comprising a third active-matrix image generator associated with a first face of the prism, the third active-matrix image generator generating an image emitted as light of at least the third wavelength that is reflected by the second dichroic mirror so as to be combined with the light of the first and second wavelengths on reaching the collimating optics.

According to a further feature of an embodiment of the present invention, the second optical surface is a planar surface that is bonded to an image input surface of the lightguide.

According to a further feature of an embodiment of the present invention, the first optical surface is a planar surface that is bonded to an output surface of the prism.

According to a further feature of an embodiment of the present invention, the first optical surface is a non-planar surface that is bonded to a corresponding non-planar output surface of the prism.

BRIEF DESCRIPTION OF THE DRAWINGS

The invention is herein described, by way of example only, with reference to the accompanying drawings, wherein:

FIG. 1A is a schematic side view of a conventional near-eye augmented-reality display employing a projector with reflective collimating optics on a polarizing beam splitter prism, described above;

FIG. 1B is a schematic side view of a conventional near-eye augmented-reality display employing a projector with refractive collimating optics, described above;

DESCRIPTION OF THE PREFERRED EMBODIMENTS

The present invention is an image projector for injecting a collimated image into an entrance aperture of a lightguide.

The principles and operation of image projectors according to the present invention may be better understood with reference to the drawings and the accompanying description.

Figure 2A:
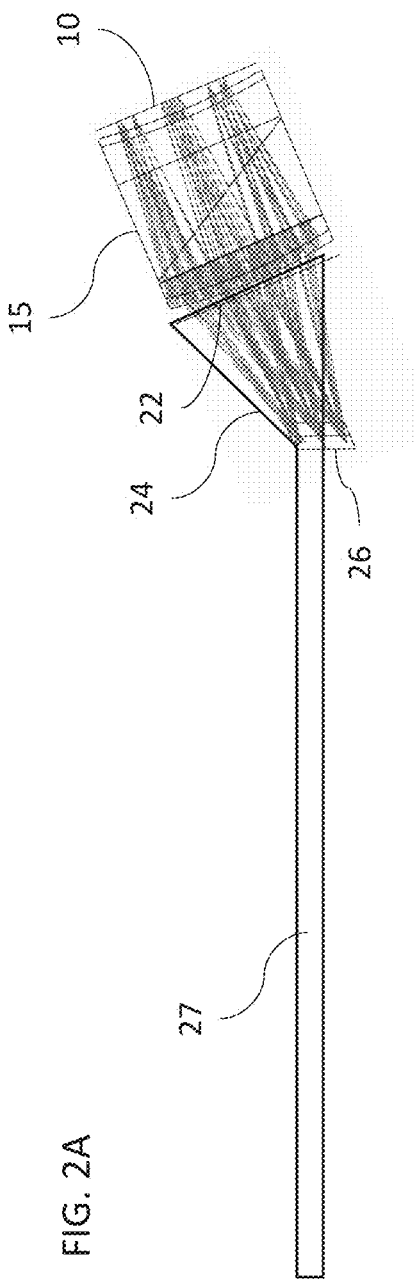
FIGS. 2A and 2B are schematic side views of a near-eye augmented-reality display employing a projector, constructed and operative according to an embodiment of the present invention, employing polarizing catadioptric collimating optics, deployed to inject a collimated image into an entrance aperture of a lightguide via a coupling prism and via a coupling reflector, respectively.
Figure 2B:
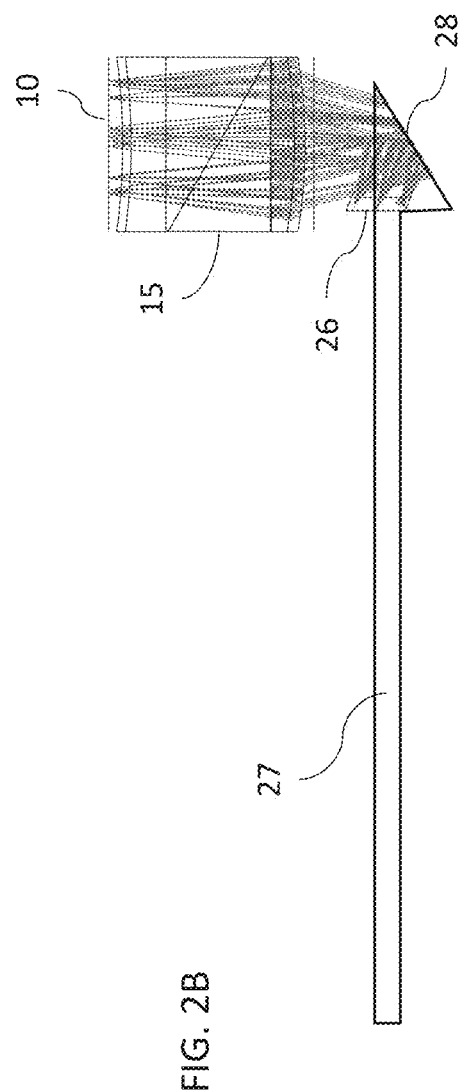

Referring now to the drawings, FIGS. 2A-7 illustrate various implementations of an image projector, constructed and operative according to aspects of the present invention, for injecting a collimated image into an entrance aperture 26 of a lightguide 27 (FIGS. 2A and 2B). In general terms, these implementations include a polarization-modifying spatial light modulator (SLM), such as a liquid crystal on silicon (LCOS) display chip 10, deployed for modifying a polarization of illumination according to image data supplied to the SLM from a suitable controller. An illumination arrangement, omitted for clarity from FIGS. 2A-5 and described below with reference to FIGS. 6A-8, is provided for illuminating SLM 10. A polarization-selective element 16, 50 or 160 selectively transmits (or selectively reflects, depending on the geometry) light from the SLM corresponding to the desired image. Collimating optics then collimates the light corresponding to the image so as to provide the collimated image at the entrance aperture 26 of lightguide 27.

Figure 3:
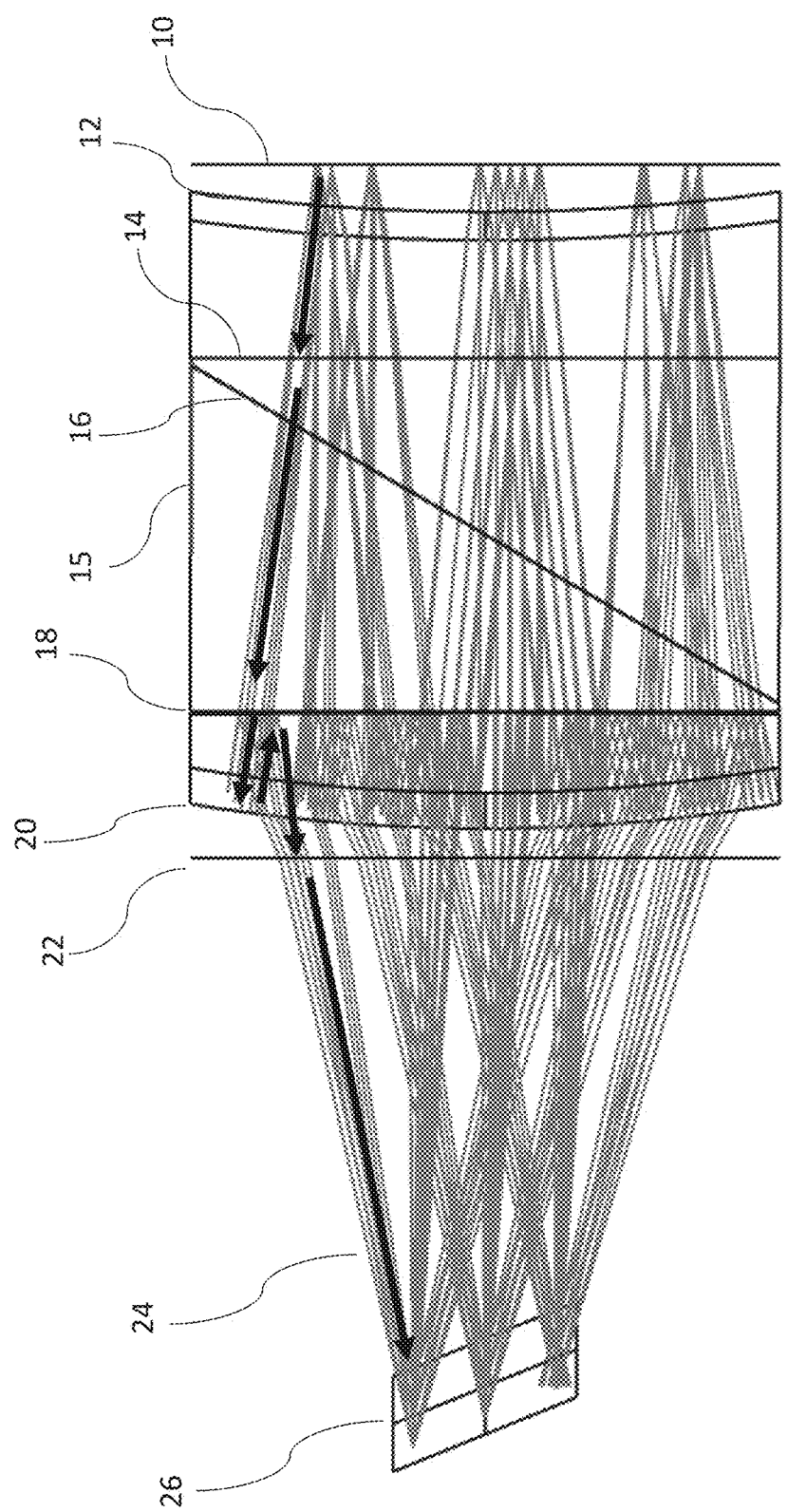
FIG. 3 is an enlarged schematic side view of the projector of FIGS. 2A and 2B according to a first implementation in which the polarizing catadioptric collimating optics is bonded to a beam-splitter prism.
Figure 4:
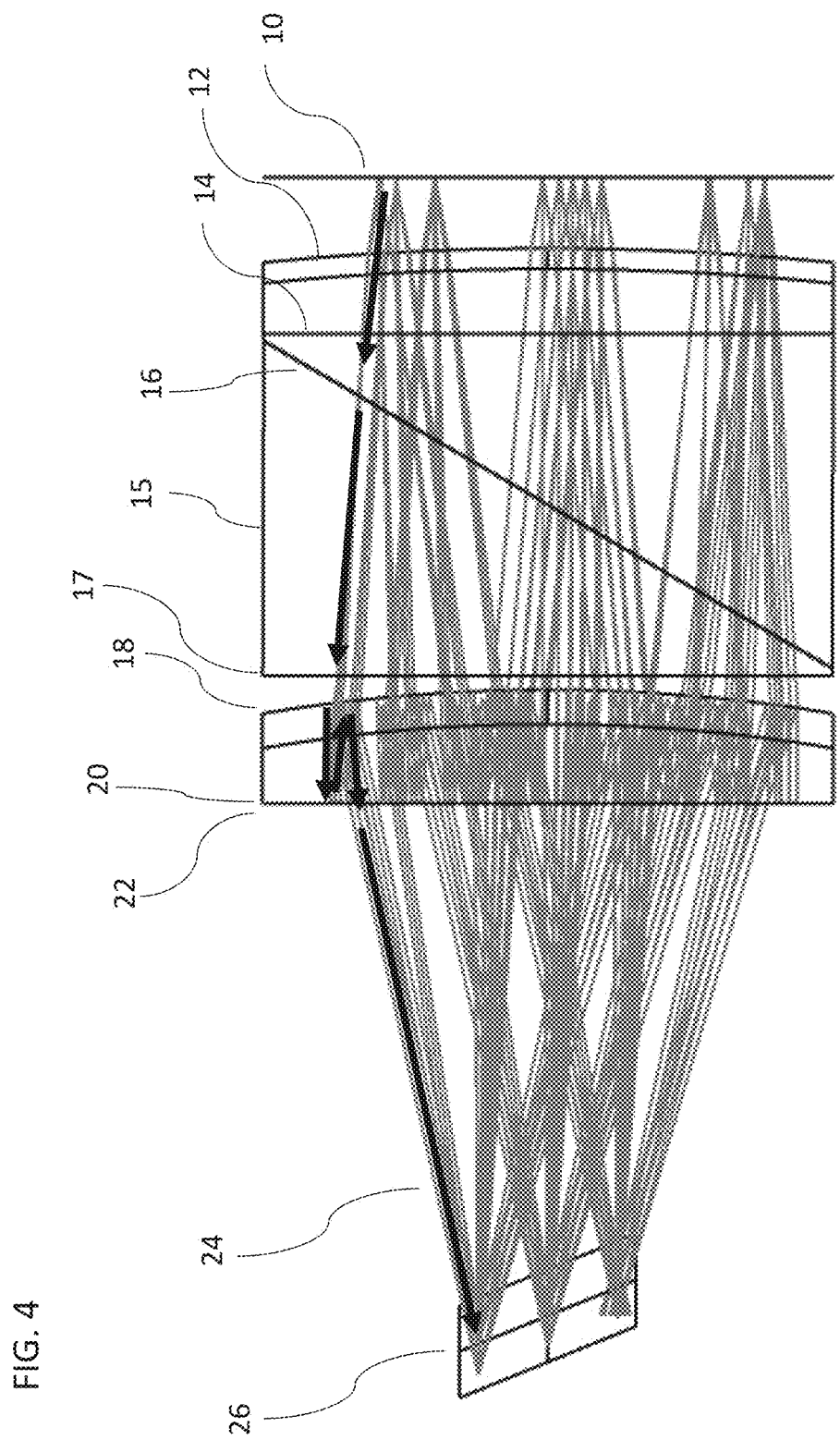
FIG. 4 is a view similar to FIG. 3 illustrating a variant implementation of the projector in which the polarizing catadioptric collimating optics is bonded to an input surface of the lightguide.
Figure 5:
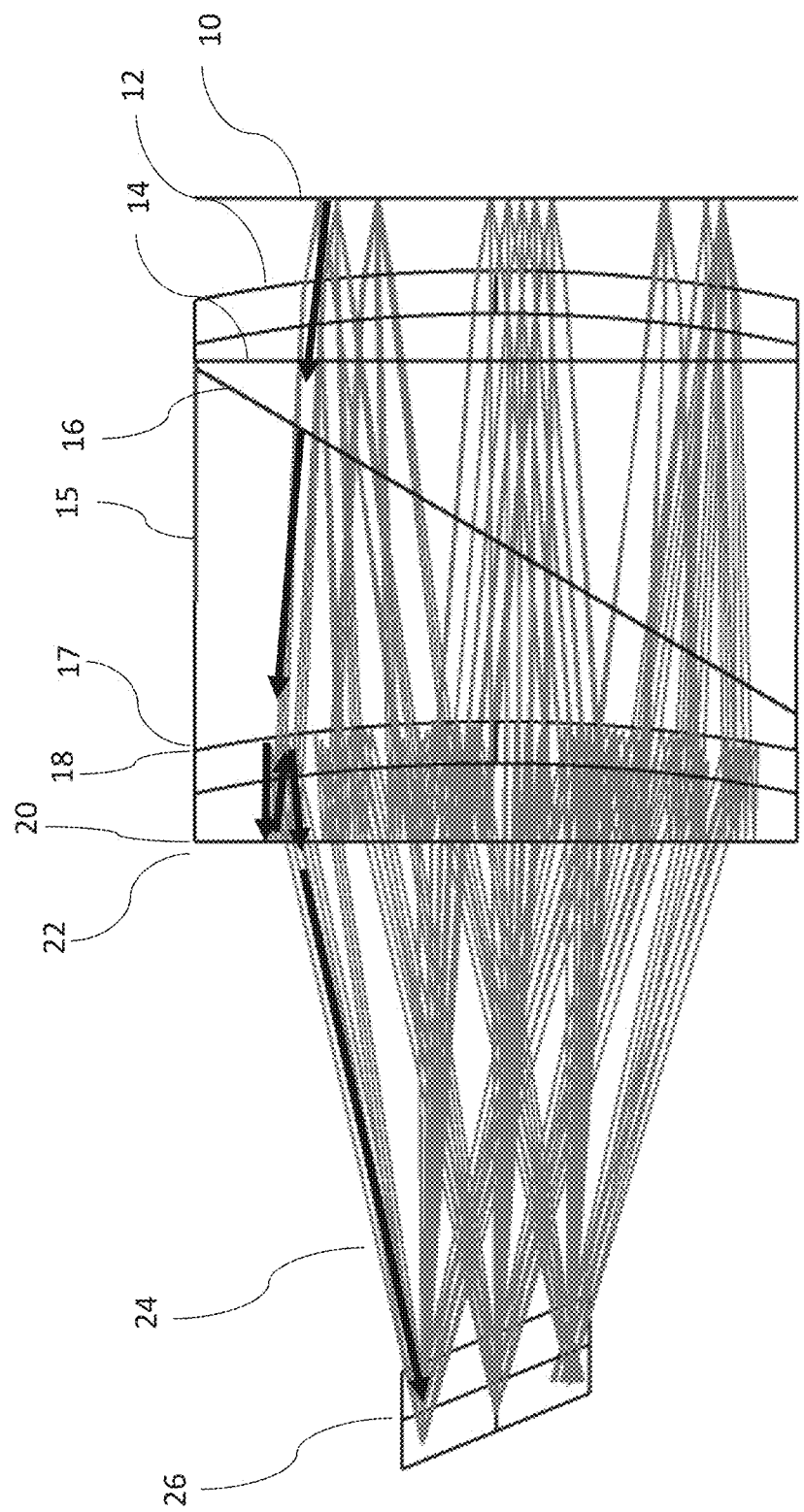
FIG. 5 is a view similar to FIG. 3 illustrating a further variant implementation of the projector in which the polarizing catadioptric collimating optics is bonded to both a beam-splitter prism and an input surface of the lightguide.

It is a particular feature of an aspect of the present invention that the collimating optics includes a polarizing catadioptric arrangement which has, sequentially, as best seen in FIGS. 3-5: a first quarter-wave plate, typically integrated with a first optical surface 18 implemented as a partial reflector, and a second quarter-wave plate, typically integrated with a second optical surface 20 implemented as a polarization-selective reflector. At least one of the first and second optical surfaces 18 and 20 is implemented as a non-planar surface with optical power which acts twice on the light, once as a refractive lens surface and once as a reflective lens, thereby achieving greatly enhanced optical power in a greatly reduced axial distance.

The projectors of the present invention are primarily applicable to display structures where the collimated image is introduced into a lightguide 27 by a geometrical-optics coupling, i.e., that does not involve diffraction. The primary examples of geometrical-optics coupling in this context are the use of a coupling prism 24 that provides an appropriately-angled coupling-in surface 22, as illustrated in FIG. 2A, and reflective coupling in employing a mirror surface 28, as illustrated in FIG. 2B. In each case, the greatly reduced axial dimension of the collimating optics according to the present invention facilitates bringing the principal plane of the collimating optics very close to the entrance aperture 26, thereby reducing the transverse dimensions of the collimating optics required to supply a given angular field of view (FOV). Additionally, by designing the collimating optics with a short focal length, the distance from the collimating optics to the image plane of the display chip, and the corresponding size of any interposed optical components (as described below), can be minimized. The exemplary embodiment illustrated in FIG. 2A has an angular FOV of 65 degrees diagonal (46×46 degrees) and a focal length of 7.9 millimeters, resulting in a particularly compact implementation.

In a first subset of particularly preferred implementations of the present invention, the polarization-selective element is a polarizing beam splitter (PBS) 16 or 50 integrated into a corresponding prism 15. The illumination arrangement directs illumination via the PBS (by reflection or transmission, depending on the geometry) towards the SLM 10.

The aforementioned small diameter and short focal length of the catadioptric optics, and the proximity of the optics to the entrance aperture of the lightguide, facilitate the use of various particularly compact PBS prism arrangements, further detailed below. Comparing FIG. 2A to FIG. 1A, it can be seen that the linear dimensions of the PBS prism 15 are in some cases approximately half those of an equivalent projector employing reflective collimating optics on a face of a PBS cube. A 2-fold reduction in linear dimensions of the PBS cube corresponds to an 8-fold reduction in the volume and mass of the prism, thereby greatly facilitating the quest for miniaturization of the image projector for a near-eye augmented reality display.

As mentioned, at least one of the first and second optical surfaces 18 and 20 is implemented as a non-planar surface with optical power which acts twice on the light, once as a refractive lens surface and once as a reflective lens. Although, in some embodiments, both optical surfaces are implemented with optical power, in certain particularly preferred embodiments, it has been found advantageous to implement one of the surfaces as a planar surface, which may facilitate manufacture and assembly of the projector. In the example illustrated in FIG. 3, first optical surface 18 is a planar surface. This option has particular synergy with use of a PBS prism to support some or all of the other components of the projector, allowing bonding of the first optical surface to a planar output surface of the prism, which simplifies assembly.

Further details of the structure and operation of the implementation of FIG. 3 are as follows. The modulated light beams of the image are reflected from the LCOS 10 (one beam path represented as arrows for clarity). The rays pass through a field lens surface 12 that serves to minimize field curvature aberrations. The beam then passes through a an angularly-selective reflector surface 14, which may be an air gap or a layer of lower refractive-index material that generates total internal reflection (TIR) at large angles. Angularly-selective reflector 14 serves to guide the illumination, as will be described below. PBS surface 16 selects the light corresponding to the image, in this case by transmission, which propagates towards first optical surface 18, which is the front surface of the catadioptric arrangement and includes a partial reflector. After passing surface 18, each beam impinges on curved second optical surface 20 that includes a polarization reflector such as a wire grid or dielectric polarizer as commonly used in pancake lenses. The beam is then reflected to first surface 18 that now partially reflects the beam through surface 20 and an airgap before passing coupling-in surface 22 and entering the coupling prism 24 (outline not shown) to reach the entrance aperture 26 of the lightguide.

The configuration described here has particular advantages of compactness and simplicity due to one or more of the following features:

1. All or most of the optical collimation is achieved by using the 'pancake' lens (surfaces 18 and 20) after the PBS.
2. The pancake lens is attached directly to a PBS prism 15 at surface 18 (preferably a flat surface).
3. A field lens is attached directly to the PBS prism 15 at angularly-selective reflector surface 14.

4. The angle of the PBS surface 16 is here shown as 30 degrees (instead of the typical 45 degrees), thereby reducing the PBS prism 15 thickness.

All the surfaces having optical power can advantageously be implemented as aspheric surfaces designed to reduce aberrations, as is known in the art. The pancake lens can be produced as a doublet designed to reduce chromatic aberrations, as is also known in the art.

Not all implementations necessarily implement all of the features described above. For example, in some cases, a field lens may not be used. This may allow implementation of a design with even shorter focal length and thereby a smaller projector size.

Coupling-in surface 22, or the external surface beyond second optical surface 20, may be provided with a polarization rotator or any other depolarizer element, depending on the design and properties of the lightguide and any associated aperture expansion and/or coupling-out arrangement, where a depolarized image is preferred. The invention is applicable to a wide range of lightguide structures, whether employing reflectors or diffractive optical elements for internal redirection of light within the lightguide and for coupling of the image out of the lightguide towards the eye of the user. Details of the lightguide design are not per se part of the present invention, and will not be described here.

Turning now to FIG. 4, this illustrates a second option according to which second optical surface 20 is a planar surface that is bonded to input surface 22 of coupling prism 24 for coupling image light into the lightguide. The first optical surface 18 is therefore implemented as a curved surface that provides the optical power of the pancake lens by acting twice on the image light. First optical surface 18 is shown here separated from surface 17, which is a flat end surface of the PBS prism 15.

In this configuration, the planar end surface of the projector (second optical surface 20) facilitates attachment of the projector to the coupling prism (surface 22) without any airgap and the correspondingly complicated supporting mechanics. Implementation of polarization-selective reflector 20 on a planar surface also facilitates manufacture. In all other respects, the structure and operation of this implementation are similar to that described above with reference to FIG. 3.

FIG. 5 shows a more compact design similar to FIG. 4, where second optical surface 20 is bonded to coupling-in surface 22, as before, and additionally, PBS prism surface 17 is bonded to first optical surface 18. In the implementation illustrated here, surfaces 18 and 17 are curved, while surfaces 20 and 22 are flat, but surfaces 20 and 22 may optionally also be implemented as curved surfaces. In this configuration the number of airgaps present in the optics is reduced, thereby reducing the need for supporting mechanics and further reducing projector size. Manufacturing techniques for forming matching curved surfaces, aligning them and bonding them are known, for example, in the context of doublet lens manufacture, and can readily be adapted to this application.

The airgap between the field lens 12 and the LCOS 10 can also be incorporated as glass with a spacer inserted so as to define the gap. In this case, fine tuning of focus is performed by selecting an appropriate spacer from a set of spacers of different sizes. This way another airgap is eliminated.

Turning now to FIGS. 6A-9, these illustrate schematically various implementations of the illumination optical path, applicable to any of the variants illustrated above in FIGS. 3-5. Non-limiting examples of illumination arrangements will be described herein that employ light sources 30 such as: the exit tip of a light-pipe; an LED surface, and a scanning mirror of a laser beam. Illumination optics 32 are preferably provided, serving to collimate the illuminating light, and preferably designed, in combination with the collimating optics, to image the illumination aperture 30 onto the exit aperture of the projector, corresponding to entrance aperture 26 of the lightguide.

Figure 6B:
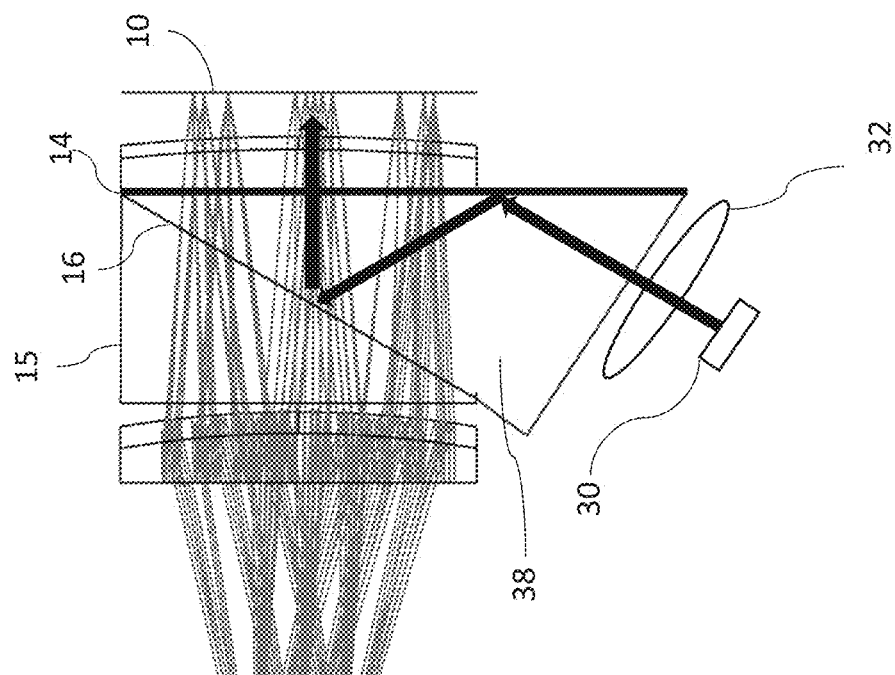
FIGS. 6A and 6B are schematic side views illustrating two possible illumination arrangements for use with the projectors of FIGS. 3-5 when implemented with a reflective spatial light modulator (SLM) and a polarizing beam splitter (PBS) inclined at 30 degrees to the SLM.
Figure 6A:
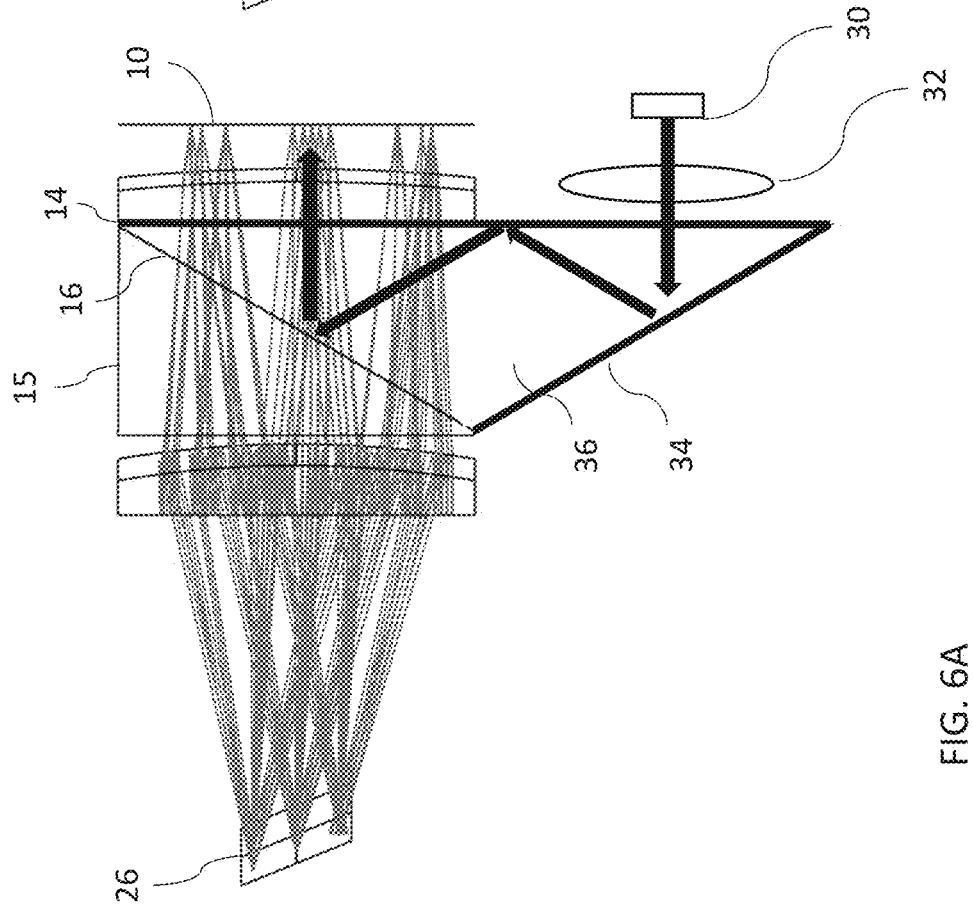

In the examples of FIGS. 6A and 6B, the PBS 16 is inclined at an angle of 30 degrees to a surface of the SLM 10, making the distance between the LCOS and the 'pancake' lens shorter and the projector smaller. In order to achieve correctly oriented illumination to the LCOS, the illumination arrangement directs illumination so as to reflect from the angularly-selective reflector 14 towards PBS 16, where it is reflected towards SLM 10. The polarization-modified light corresponding to the image is then transmitted by angularly-selective reflector 14 and is selected by PBS 16 so as to propagate towards the collimating optics (which functions as described above).

The angularly-selective reflector 14 is preferably deployed parallel to the SLM 10 between the SLM and the PBS 16. In order to support the above functionality, the angularly-selective reflector should be reflective for visible light incident at an angle of incidence in the region of 60 degrees (from a normal to the surface) and substantially transparent to visible light incident at an angle of incidence of less than 30 degrees to the normal to the surface. Such properties can conveniently be provided by leaving an airgap, or by including a layer of low refractive-index material, which provide properties of total internal reflection (TIR) at angles of incidence greater than a critical angle. Alternatively, similar properties may be provided by multi-layer dielectric coatings implemented so as to provide the required angularly-selective reflection.

FIGS. 6A and 6B illustrate two options for the geometry of light injection by the illumination arrangement. In FIG. 6A, light from source 30 enters an illumination prism 36 to be reflected by a mirror on surface 34. The high-angle illuminating light is then reflected from surface 14 towards PBS surface 16, where it is reflected to illuminate the LCOS 10. This geometry allows injection of illumination along an axis which is parallel to the optical axis of the projector.

FIG. 6B illustrates an alternative injection geometry, where the illumination light is injected from an appropriately-angled face at side of an illuminating prism 38. Here no reflecting mirror 34 is needed.

Figure 7:
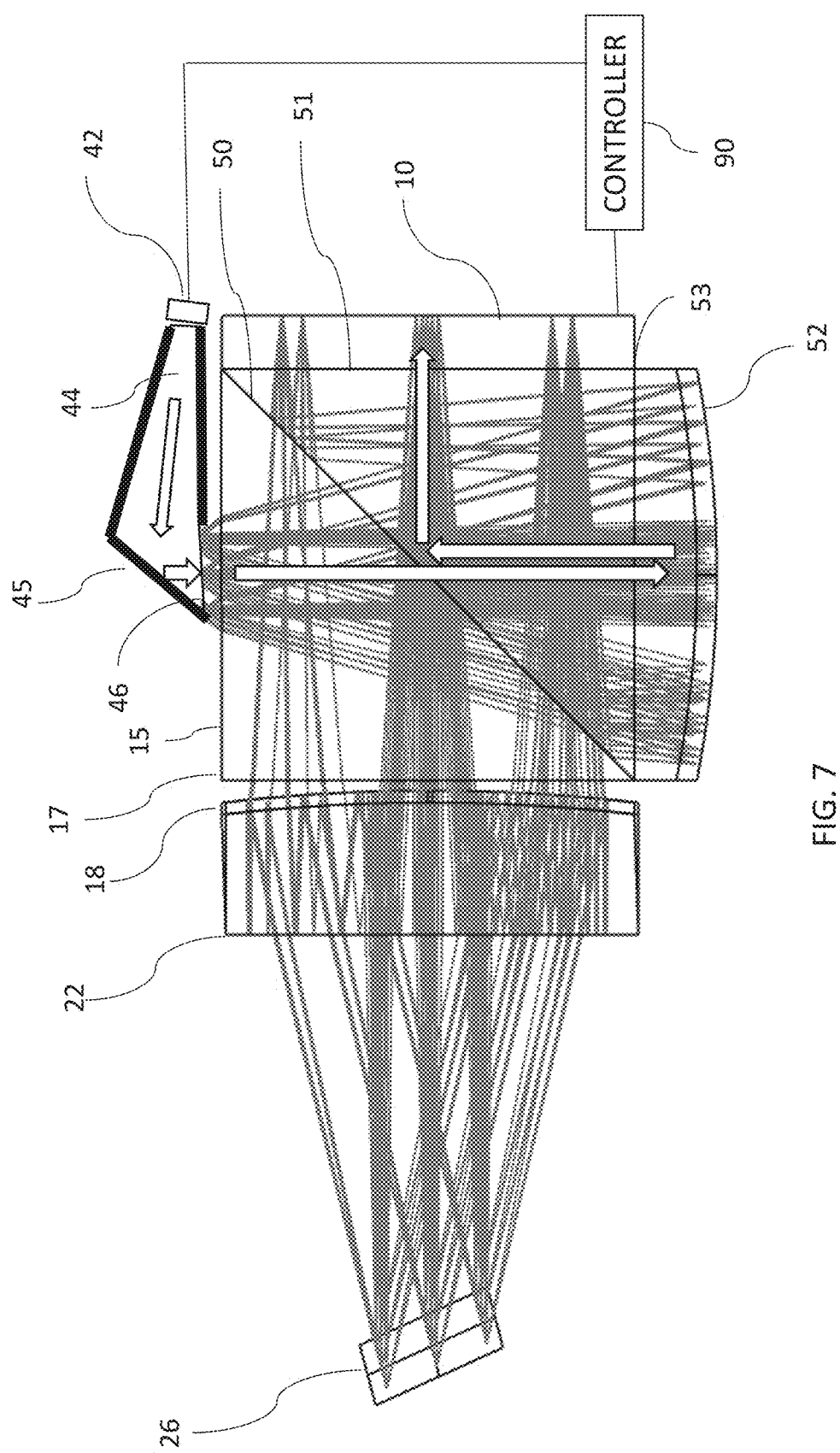
FIG. 7 is a schematic side view of a further implementation of a projector, constructed and operative according to an embodiment of the present invention, implemented with a 45-degree PBS.

FIG. 7 illustrates an alternative implementation in which PBS surface 50 is inclined at an angle of 45 degrees to the surface of the SLM 10. In this case, a quarter-wave plate 53 and an illumination-optics reflective lens 52 are associated with a face of the PBS prism for directing illumination that has passed through the PBS back towards the PBS to be reflected by the PBS 50 towards the SLM 10. In this case, the illumination arrangement includes a light source 42 associated with an illumination aperture 46 from which light propagates through the prism towards the illumination-optics reflective lens 52. Illumination-optics reflective lens 52 and the collimating optics are most preferably configured to image the illumination aperture 46 to the entrance aperture 26 of the lightguide, thereby optimizing efficiency of the optics (which is already limited by the use of "pancake lens" technology) and reducing stray light.

The pancake lens arrangement illustrated here is equivalent to FIG. 4, but could equally be implemented like the structures of FIG. 3 or 5. A further variant feature, illustrated here but applicable to any embodiment, is that the LCOS 10 is here shown attached directly to the PBS prism at surface 51, without a field lens and the consequent extra length and/or air gap. Focusing adjustments can be made by adjusting the gap between surfaces 17 and 18.

According to the particularly preferred but non-limiting implementation illustrated here, the light from source 42 propagates along a light-pipe 44, which is preferably an expanding light-pipe. The light is reflected by reflector 45 onto aperture 46. As mentioned above, the subsequent optics preferably image plane 46 onto exit aperture 26 thereby achieving minimal power loss. Improved uniformity can be achieved by implementing a diffuser in the light-pipe or at plane 46. Preferably, a polarizing filter should be placed in plane 46, transmitting P polarization.

The P-polarized transmitted light passes though PBS 50 and propagates onto reflecting lens 52. This lens incorporates a quarter-wave waveplate so that the reflective light is now S polarized, so as to be reflected by PBS 50 onto the LCOS 10.

Throughout this document, it will be understood that the optical arrangements illustrated here are supplemented by various control components, which provide power and input data to update the SLM and to synchronously operate the illumination arrangement in order to generate the required output images. These components are represented schematically in FIGS. 7 and 8 by controller 90, which has been omitted from the other drawings for simplicity of presentation. The structure and operation of controller 90 will be clear to a person having ordinary skill in the art, and will not be described herein in detail.

Figure 8:
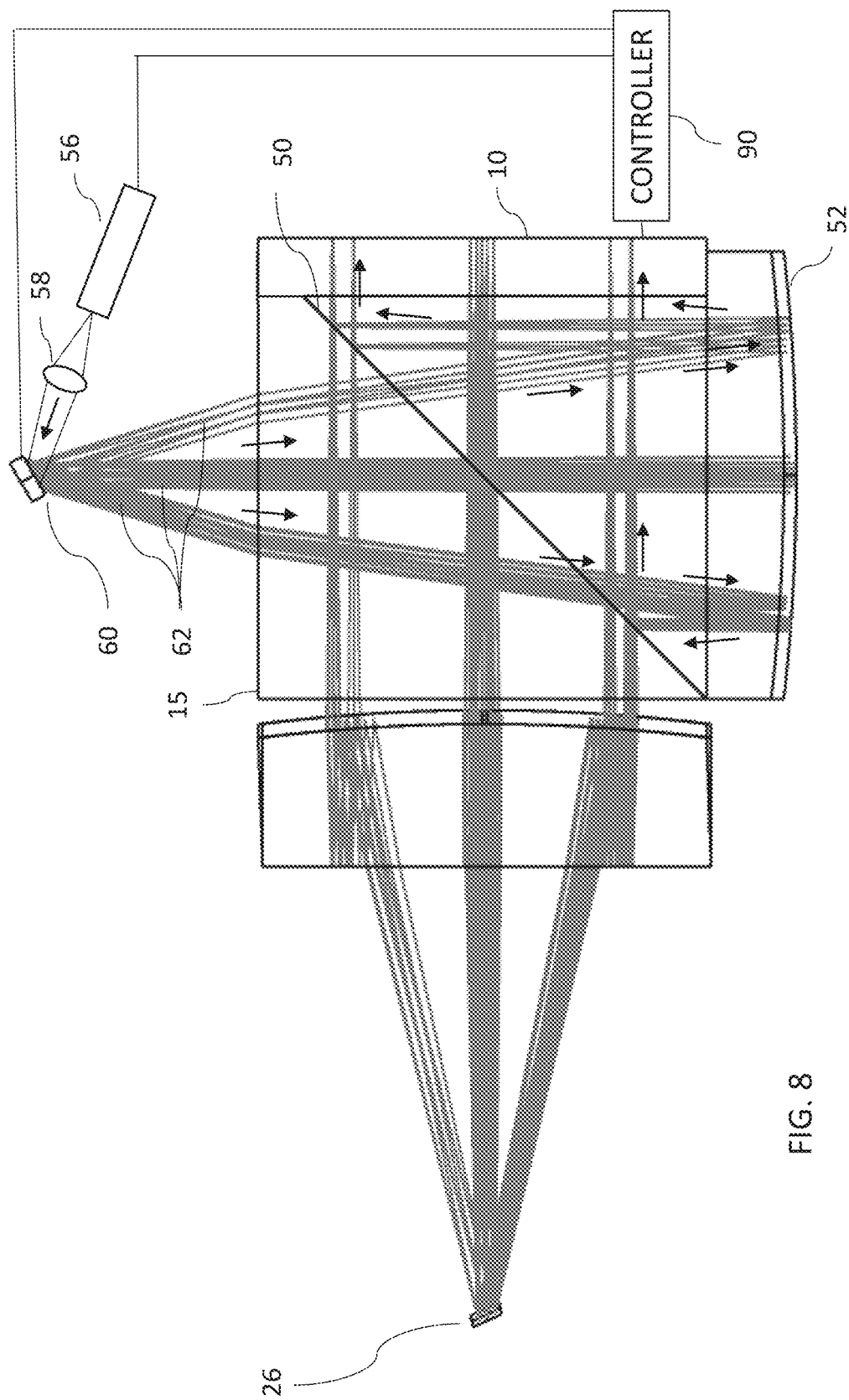
FIG. 8 is a schematic side view similar to FIG. 7 illustrating an implementation of a projector, constructed and operative according to an embodiment of the present invention, employing a modulated scanned laser beam for illumination.

Turning now to FIG. 8, this illustrates a further option in which the illumination arrangement includes a scanning mirror 60 for scanning a beam of illumination, typically from a laser source 56 collimated by optics 58, through a range of angles about at least one tilt axis. Scanning mirror 60 is deployed to direct the beam of illumination through the prism towards the illumination-optics reflective lens 52, from which point the light path is similar to that of FIG. 7. Most preferably, illumination-optics reflective lens 52 and the collimating optics are configured to image scanning mirror 60 to the entrance aperture of the lightguide 26, thereby optimizing energy transfer of the amount of the laser illumination entering the lightguide.

In the non-limiting implementation illustrated in FIG. 7, the LCOS 10 is located opposite the collimating optics, and the illumination prism and illumination optics are arranged on lateral surfaces of the prism, with the light path undergoing a sequence of transmission-reflection-transmission at the PBS. It will be appreciated that this arrangement can be varied, for example employing a light path sequence of reflection-transmission-reflection, where it is reflection at the PBS which selects the desired image light reflected from the LCOS. The overall functionality of the image generation and collimation remains unchanged.

This configuration therefore provides scanning laser illumination over the SLM, so that the selective illumination of the SLM and the modulation of the SLM both contribute to image formation. The beam from laser 56 is collimated by optics 58 onto scanning mirror 60. The plane of scanner 60 is imaged by the subsequent optics onto output aperture 26 (displayed in FIG. 8 as being of reduced dimensions according to the laser beam width). The scanned beams 62 from laser 56 are P-polarized and therefore pass-through PBS 50 onto reflecting lens 52. After polarization rotation, the S-polarized beams reflect from PBS 50 onto LCOS 10. LCOS 10 may include a micro lens array or diffuser to expand the beam as it propagates to aperture 26. It is apparent that, because of the narrow illuminating laser beams, the PBS can be made smaller.

Although FIG. 8 has been described as laser scanning over LCOS, according to a further alternative implementation, the same structure can be adapted to employ laser scanning as the sole image generating mechanism. In this case, the LCOS is replaced by a beam-spreading reflector, typically implemented as a reflective micro-lens array (MLA) associated with a quarter-wave plate. Controller 90 varies the intensity of the laser beam synchronously with the scanning motion to generate a time-averaged intensity distribution of light at the beam-spreading reflector over the period of each image frame corresponding to the desired image. In all other respects, this arrangement is structurally and functionally similar to the LCOS version of FIG. 8 as already described above.

Figure 9:
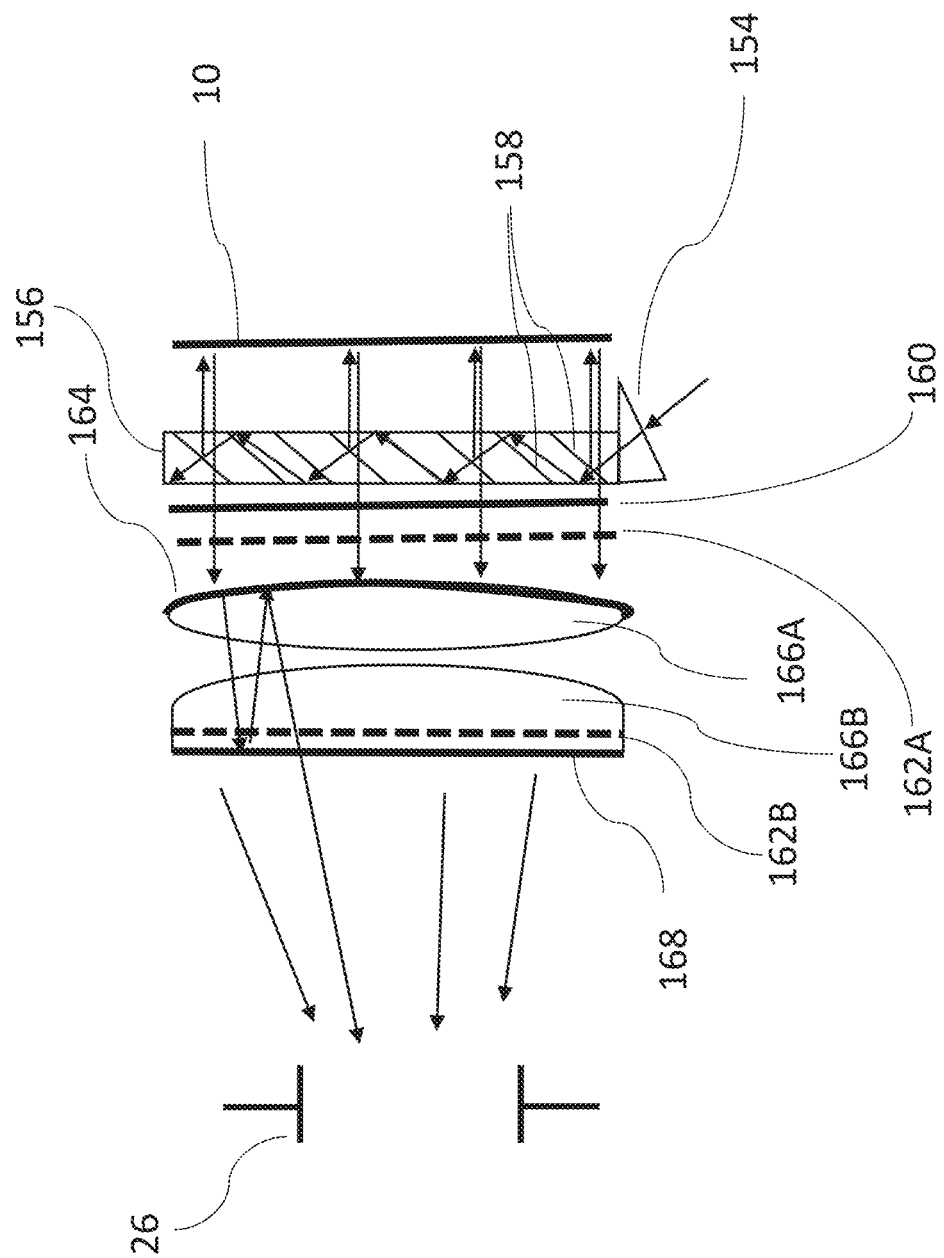
FIG. 9 is a schematic side view of a further implementation of a projector, constructed and operative according to an embodiment of the present invention, employing a lightguide element for illumination of an SLM.

Turning now to FIG. 9, this illustrates an alternative implementation of the present invention which replaces the PBS prism of the previous embodiments with a slab-type lightguide for illuminating the SLM. This allows further shortening of the focal length of the collimating optics, further miniaturization of the LCOS, and hence overall size and weight reduction compared to implementations using a 45-degree PBS cube (or 30-degree cuboid) and/or further increase in the angular FOV.

Specifically, the illumination arrangement here includes a lightguide 156 having a pair of mutually-parallel major surfaces for supporting propagation of illumination by internal reflection at the major surfaces, and a plurality of mutually-parallel partially-reflecting coupling-out surfaces 158 internal to the lightguide and oriented obliquely to the major surfaces so as to couple out illumination towards the SLM 10.

Polarized illumination is coupled through a prism 154 into lightguide 156 to propagate by total-internal-reflection (TIR). The guided light impinges on polarization-selective partial reflectors 158 to be coupled out onto the spatial light modulator (LCOS) 10. The reflected light is spatially modulated (for example by polarization rotation) and reflected. This reflected light passes through partial reflectors 158 and through waveguide 156. This light also passes through a polarizer 160. This polarizer preferably provides some or all of the following functions:

To filter out residual S-polarization that penetrated partial reflectors 158 so that the image has the appropriate contrast as modulated by LCOS 10;

To ensure the correct input polarization for the pancake optics to follow, thereby avoiding losses at the first reflection from second optical surface 168; and Preferably also to suppress reflected light from the pancake lens by absorbing much of the light reflected from partial reflector 164 which has passed twice through the waveplate 162A and therefore polarized orthogonally to the transmission axis of polarizer 160.

The beam continues to pass through a quarter-wave 162A and imping on partial reflector 164 (corresponding to first optical surface 18, above). Lenses 166A and 166B perform collimation as the beam propagates back and forth, passing also through quarter-wave plate 162B and reflective polarizer 168, corresponding to second optical surface 20, above (the optical path being shown schematically for one beam).

The above system has small dimension, can support large field while using short focal length and at same time couple light into waveguide aperture 26 that is also located at a short distance from the collimating optics.

Figure 10:
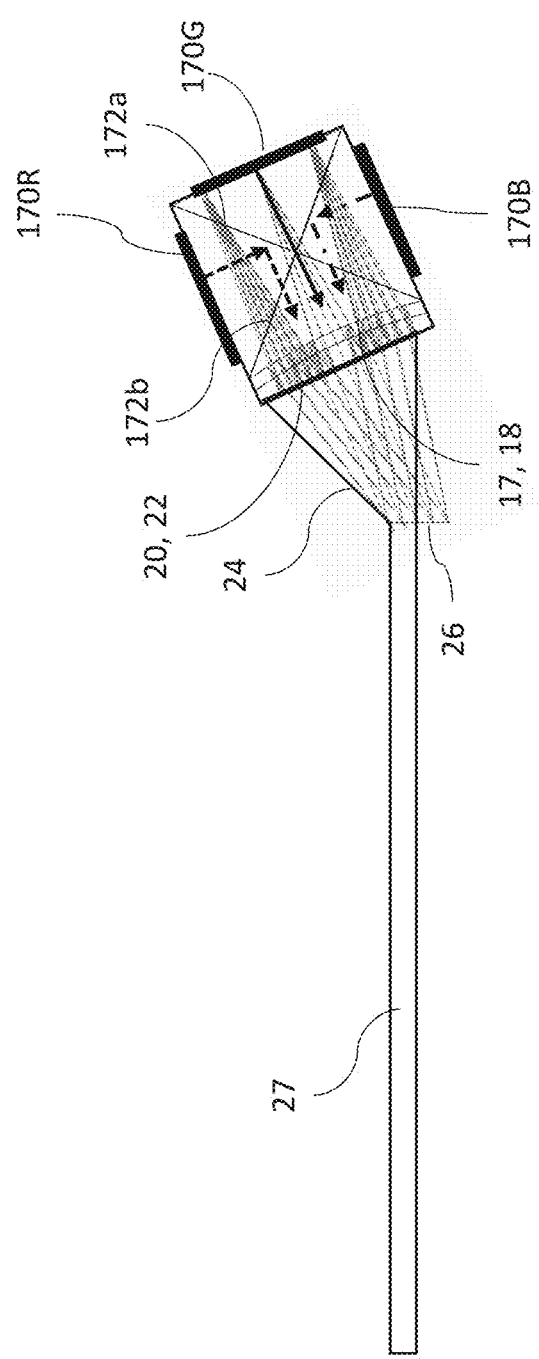
FIG. 10 is a schematic side view of a further implementation of a projector, constructed and operative according to an embodiment of the present invention, employing a dichroic cube and active-matrix image generators.

Turning now to FIG. 10, it should be noted that the advantages of the various prism-based embodiments as illustrated above with reference to FIGS. 3-8 can be generalized to substantially any image-generating technology which can be associated with an image-plane surface of the prism, allowing various implementations that utilize a beam-splitter within the prism, and maintaining a short distance from the image plane to the collimating optics and from the collimating optics to the entrance aperture of the lightguide, as already illustrated. FIG. 10 illustrates a further example in which the beam splitter is one or more dichroic mirrors, and wherein the image generators are active-matrix image generators, such as OLED or micro-LED arrays.

In the particularly preferred but non-limiting example illustrated here, images of each color (e.g., RGB) are generated by a different active-matrix image generators (170R, 170G and 170B, respectively), and the surfaces 172a and 172b are dichroic combiners (dichroic mirrors) that combine the color beams within the dichroic prism (shown by solid and dashed arrows, rays shown only from 170G for clarity). Since the illumination from the sources 170 may be unpolarized, an additional polarizer may be introduced directly adjacent to every source or as a first element on surface 17. The form of the catadioptric collimating arrangement and its association with the prism is illustrated here in a form analogous to FIG. 5, but may alternatively be according to the structures illustrated in FIG. 3 or FIG. 4.

In the embodiment illustrated here, a first active-matrix image generator 170R generates an image emitted as light of at least a first wavelength (red) that is reflected by dichroic mirror 172a, while a second active-matrix image generator 170G associated with a second face of the prism generates an image emitted as light of at least a second wavelength (green) that is transmitted by dichroic mirror 172a, thereby being combined with the red light on reaching the collimating optics. Second dichroic mirror 172b is non-parallel to dichroic mirror 172a, and is transparent to red and green light while being reflective to light of a third wavelength, blue. A third active-matrix image generator 170B, associated with a further face of the prism, generates an image emitted as light of at least the third wavelength (blue) that is reflected by the second dichroic mirror 170b so as to be combined with the red and green light on reaching the collimating optics. By generating images corresponding to RGB separations of the overall image to be displayed, the separate images are all combined and delivered to the collimating optics, for display to the eye of the user.

It will be appreciated that the above descriptions are intended only to serve as examples, and that many other embodiments are possible within the scope of the present invention as defined in the appended claims.

What is claimed is:

1. An image projector for injecting a collimated image into an entrance aperture of a lightguide, the image projector comprising:
   (a) a polarization-modifying spatial light modulator (SLM) deployed for modifying a polarization of illumination according to image data supplied to said SLM;
   (b) an illumination arrangement for illuminating said SLM with polarized illumination;
   (c) a polarization-selective element deployed to select light from said SLM corresponding to an image; and
   (d) collimating optics for collimating the light corresponding to the image so as to provide the collimated image at the entrance aperture of the lightguide, wherein said collimating optics includes a polarizing catadioptric arrangement comprising, sequentially:
      (i) a first quarter-wave plate;
      (ii) a first optical surface implemented as a partial reflector;
      (iii) a second quarter-wave plate; and
      (iv) a second optical surface implemented as a polarization-selective reflector,
      wherein at least one of said first and second optical surfaces is implemented as a non-planar surface with optical power which acts twice on the light, once as a refractive lens surface and once as a reflective lens.

2. The image projector of claim 1, wherein said polarization-selective element is a polarizing beam splitter (PBS) integrated into a prism, and wherein said illumination arrangement directs illumination so as to reflect from said PBS towards said SLM.

3. The image projector of claim 2, wherein said PBS is inclined at an angle of 30 degrees to a surface of said SLM, the image projector further comprising an angularly-selective reflector deployed parallel to said SLM between said SLM and said PBS, said illumination arrangement directing illumination so as to reflect from said angularly-selective reflector towards said PBS, and to reflect from said PBS towards said SLM, said angularly-selective reflector being reflective for visible light incident at an angle of incidence of 60 degrees and substantially transparent to visible light incident at an angle of incidence less than 30 degrees.

4. The image projector of claim 2, wherein said PBS is inclined at an angle of 45 degrees to a surface of said SLM, the image projector further comprising a quarter-wave plate and an illumination-optics reflective lens associated with a face of said prism for directing illumination that has passed through said PBS back towards said PBS to be reflected at said PBS towards said SLM.

5. The image projector of claim 4, wherein said illumination arrangement further comprises a light source associated with an illumination aperture from which light propagates through said prism towards said illumination-optics reflective lens, and wherein said illumination-optics reflective lens and said collimating optics are configured to image said illumination aperture to the entrance aperture of the lightguide.

6. The image projector of claim 4, wherein said illumination arrangement further comprises a scanning mirror for scanning a beam of illumination through a range of angles about at least one tilt axis, said scanning mirror being deployed to direct the beam of illumination through said prism towards said illumination-optics reflective lens, and wherein said illumination-optics reflective lens and said collimating optics are configured to image said scanning mirror to the entrance aperture of the lightguide.

7. The image projector of claim 2, wherein said second optical surface is a planar surface that is bonded to an image input surface of the lightguide.

8. The image projector of claim 2, wherein said first optical surface is a planar surface that is bonded to an output surface of said prism.

9. The image projector of claim 2, wherein said first optical surface is a non-planar surface that is bonded to a corresponding non-planar output surface of said prism.

10. The image projector of claim 1, wherein said illumination arrangement comprises a lightguide having a pair of mutually-parallel major surfaces for supporting propagation of illumination by internal reflection at said major surfaces, and a plurality of mutually-parallel partially-reflecting coupling-out surfaces internal to said lightguide and oriented obliquely to said major surfaces so as to couple out illumination towards said SLM.

11. An image projector for injecting a collimated image into an entrance aperture of a lightguide, the image projector comprising:
  (a) a beam splitter integrated into a prism;
  (b) an image generator configured for generating an image at an image plane associated with a third face of said prism; and
  (c) collimating optics for collimating light of the image so as to provide a collimated image at the entrance aperture of the lightguide, wherein said collimating optics includes a polarizing catadioptric arrangement comprising, sequentially:
    (i) a first quarter-wave plate;
    (ii) a first optical surface implemented as a partial reflector;
    (iii) a second quarter-wave plate; and
    (iv) a second optical surface implemented as a polarization-selective reflector,
    wherein at least one of said first and second optical surfaces is implemented as a non-planar surface with optical power which acts twice on the light, once as a refractive lens surface and once as a reflective lens.

12. The image projector of claim 11, wherein said beam splitter is a polarizing beam splitter (PBS), the image projector further comprising:
  (a) an illumination arrangement comprising at least one light source for generating a modulated intensity beam of light and a scanning mirror for scanning the beam of light through a range of angles about at least one tilt axis, said scanning mirror being deployed to direct the beam of light into a first face of said prism;
  (b) an illumination-optics reflective lens and a first quarter-wave plate associated with a second face of said prism for directing light that has passed through said prism back towards said PBS;
  (c) a beam-spreading reflector and a second quarter-wave plate associated with the third face of said prism; and
  (d) a controller for synchronously modulating an intensity of said light source and controlling said scanning mirror so as to generate a time-averaged intensity distribution of light at said beam-spreading reflector corresponding to an image.

13. The image projector of claim 11, wherein said beam splitter is a dichroic mirror, and wherein said image generator is a first active-matrix image generator generating an image emitted as light of at least a first wavelength that is reflected by said dichroic mirror, the image projector further comprising a second active-matrix image generator associated with a second face of said prism, said second active-matrix image generator generating an image emitted as light of at least a second wavelength that is transmitted by said dichroic mirror so as to be combined with the light of said first wavelength on reaching said collimating optics.

14. The image projector of claim 13, further comprising a second dichroic mirror deployed within said prism non-parallel to said dichroic mirror, said second dichroic mirror being transparent to light of said first and second wavelengths and reflective to light of a third wavelength, the image projector further comprising a third active-matrix image generator associated with a first face of said prism, said third active-matrix image generator generating an image emitted as light of at least the third wavelength that is reflected by said second dichroic mirror so as to be combined with the light of said first and second wavelengths on reaching said collimating optics.

15. The image projector of claim 11, wherein said second optical surface is a planar surface that is bonded to an image input surface of the lightguide.

16. The image projector of claim 11, wherein said first optical surface is a planar surface that is bonded to an output surface of said prism.

17. The image projector of claim 11, wherein said first optical surface is a non-planar surface that is bonded to a corresponding non-planar output surface of said prism.

* * * * *